United States Patent [19]

Vinzia et al.

[11] Patent Number: 4,861,152
[45] Date of Patent: Aug. 29, 1989

[54] CONTACT LENS HAVING AT LEAST ONE ASPHERICAL, PROGRESSIVE MULTIFOCAL FACE, PROCESS FOR THE PREPARATION THEREOF AND USE OF THIS CONTACT LENS AS AN INTRA-OCULAR IMPLANT TO BE SUBSTITUTED FOR THE EYE CRYSTALLINE LENS

[76] Inventors: Francis D. Vinzia, 23, Avenue Général Leclerc, 92350 Le Plessis Robinson; Roger J. A. Bonnet, 122, Avenue du Commandant Roland, Bat, K3, La Cadenelle, 13008 Marseille, both of France

[21] Appl. No.: 799,585

[22] Filed: Nov. 19, 1985

[30] Foreign Application Priority Data

Nov. 26, 1984 [FR] France .................. 84 17989

[51] Int. Cl.$^4$ ............................................. G02C 7/04
[52] U.S. Cl. ........................... 351/161; 351/160 R
[58] Field of Search ........................... 351/161, 160 R

[56] References Cited

U.S. PATENT DOCUMENTS

| | | | |
|---|---|---|---|
| Re. 25,286 | 11/1962 | DeCarle | 351/161 |
| 4,401,372 | 8/1983 | Mancini et al. | 351/16 DH |
| 4,418,991 | 12/1983 | Breger | 351/161 |
| 4,508,436 | 4/1985 | Sitterle | 351/16 DH |
| 4,580,882 | 4/1986 | Nuchman et al. | 351/16 DH |
| 4,636,049 | 1/1987 | Blaker | 351/161 |

FOREIGN PATENT DOCUMENTS

| | | |
|---|---|---|
| 1217892 | 5/1960 | France . |
| 1423908 | 11/1965 | France . |
| 2314512 | 1/1977 | France . |

*Primary Examiner*—Rodney B. Bovernick
*Assistant Examiner*—Ronald M. Kachmarik
*Attorney, Agent, or Firm*—Steinberg & Raskin

[57] ABSTRACT

The invention concerns an aspherical multifocal contact lens comprising at least one optical zone for the vision for near and at least one optical zone for the vision for far, without intermediary line and without transition between said zones, said aspherical face being foreseen to define a central optical zone with a predetermined great aberration, on a predetermined size, said great aberration of said central optical zone being said greatest of said lens. This contact lens provides a better quality of correction and a better clearness of image and can be used as an intra-ocular implant to be substituted for the eye crystalline lens.

6 Claims, 2 Drawing Sheets

CONTACT LENS HAVING AT LEAST ONE ASPHERICAL, PROGRESSIVE MULTIFOCAL FACE, PROCESS FOR THE PREPARATION THEREOF AND USE OF THIS CONTACT LENS AS AN INTRA-OCULAR IMPLANT TO BE SUBSTITUTED FOR THE EYE CRYSTALLINE LENS

BACKGROUND OF THE INVENTION

The invention essentially relates to a contact lens having at least one aspherical, progressive multifocal face, a process of preparation thereof and the use thereof as an intra-ocular implant to be substituted for the eye crystalline lens.

There is now an increased need for contact lenses allowing the vision both for far and near, for persons having difficulties for accommodation, notably the presbytic patients.

A number of solutions have been proposed these last years to solve this technical problem. Most of them are based on the location of a vision correction for near, at the periphery of the lens, different from the vision correction for far, by a simple movement of the lens at the time of lowering the eyes, in the path from the far vision (horizontal looking) to the near vision (see FR-A-No. 1 423 908 YSOPTIC).

In this movement, the lens, by bearing on the edge of the lower eye lid, is displaced upwards during the lowering of the looking and is putting in place the near correction before the pupil.

Two types of lenses have been proposed, the first type consisting in the performing of a near vision located at the periphery of the lens, in a restricted area of the lens, the rest of the lens performing a correction for far.

The second type of lens is generally conceived to perform a correction for near and the central portion is flattened to perform a correction for far. This lens is called a bifocal type lens. Thus, the vision for near is corrected at the periphery of the lens, the center performing a correction for far.

In the case where the lens is displaced by bearing on the edge of the lower eye lid, the lens does not provide a good correction. Indeed, in most cases, in view of the great number of parameters to be satisfied, the two corrections are subsisting and the subject has a double vision. The problem can only be solved in that case from 1 to 2% of the cases. These parameters are for instance the diameter of the restricted area, the position of the latter, the clearance of the lower eye lid, the diameter of the pupil, the importance of the displacement of the lens etc. . . .

A good working of the lens supposes the coexistence of two contradictory conditions, namely:

A sufficiently ample displacement of the lens, and a good tolerance in the wearing of the lens which supposes a limitation of the displacements thereof.

On the other hand, with these bifocal or multifocal lenses, an additional problem lies in that at the border line of the portion correcting the vision for near with the portion for correcting the vision for far, a junction is obtained also called an intermediary line or a transition zone, due to the differences of curvature radius to obtain the bifocal or multifocal character of the lens. Such junctions are generating a junction or intermediary zone causing a jump in image. In the case of multifocal lenses, there is thus obtained a multiplication of the junctions, which is unacceptable.

To remedy to these drawbacks, other solutions have been proposed trying to introduce a progressive curvature or bend on the external or inner face of the lens to allow a progressive passage from the vision for far to the vision for near, either by the movement of the lens, or by performing a progressive power from the centre up to the edge of the lens, inside the pupil (simultaneous vision).

However, such solutions are again unsatisfactory as regards the quality of the correction, in particular with respect to the value of the near correction to be reached, as concerns the clearness of the corrected image.

SUMMARY OF THE INVENTION

One main object of the present invention is therefore to provide new contact lenses without the abovesaid drawbacks of the prior contact lenses, with an excellent correction for near as well as an improved clearness (distinctness) of the image.

Another main object of the present invention is also to provide a new multifocal contact lens of a particularly simple conception, as well as a process for easily manufacturing it so as to limit or lower the manufacturing cost of this new lens.

All these objects and purposes are achieved according to the present invention by the provision of a contact lens, having at least one aspherical, multifocal face, comprising at least an optical zone for the vision for near and at least one optical zone for the vision for far, without intermediary line and without transition between said zones, characterized in that said aspherical face is foreseen so as to define a central optical zone with a predetermined great aberration, with a predetermined size, this great aberration of said central optical zone being the greatest of the lens.

According to a particular embodiment, the abovesaid central optical zone of great aberration constitutes an optical zone for the vision for near.

According to a specific embodiment of the invention contact lens, at least one face has a general shape selected among a torus surface, the revolution axis of said torus being essentially identical with the optical axis of said lens.

According to a particular feature, the curve or line generating the torus surface is selected from the group consisting of a circular curve, a parabolic curve, a hyperbolic curve and an elliptic curve, or any combination thereof.

According to another specific feature of the invention lens, the distance from the centre of the torus generating line to the axis of revolution of the torus is very low, preferably about 3 to 4 hundredth of millimetres, thereby having the peripheral portion or peripheral optical zone of said lens face very close substantially to the osculating sphere thereof.

According to an actually preferred embodiment, the size of the central optical zone with great aberration is substantially equal to, or lower than, that of the eye pupil, preferably from 1.5 to 2.5 millimeters.

Advantageously, this central optical zone is close to the axis of revolution of said torus.

According to another particular embodiment of the invention lens, this lens has at least one face having generally a tapered torus shape with respect to a identical lens of the same revolution axis having the same face with a spherical general shape, thereby obtaining a positive progressive corrective power and therefore a greater corrective power at the centre with respect to the periphery of the lens, irrespective of having this face concave or convex.

According to another embodiment, this invention lens has at least one face having a general shape of a torus of a pumpkin type shape with respect to an identical lens of the same revolution axis for which the same face has a generally spherical shape, thereby obtaining a shape incurved inwardly at the vicinity of the centre of the lens and a negative progressive corrective power with a lower corrective power in the centre of the lens, irrespective of the fact that the face be concave or convex.

Of course, such a lens according to the invention can be manufactured in any appropriate material and therefore can be of the soft or hard or flexible type.

On the other hand, such a type of lens can also be used as an intra-ocular implant to be substituted for the eye crystalline lens.

With such a lens according to the invention, comprising at least a central optical zone of great aberration, it is achieved a very quick variation of corrective power on a very little surface, and beyond from said central optical zone of great aberration, the corrective power is essentially the same.

Preferably, the difference between the dioptrie values between the vicinity of the central optical zone and the edge of the lens is of about 0.25 dioptrie.

Such a lens according to the invention provides the advantage of having a variable corrective power from the centre to the periphery which can be either positive or negative, the greatest variation of corrective power being obtained in the centre of the lens, which is very favourable since the eye is more sensitive at the centre than at the periphery.

For this reason, it is preferred to have the vision for near at the centre of the lens. Accordingly, according to the invention, it is preferred to manufacture the invention contact lens with the central optical zone with great aberration to constitute an optical zone for the vision for near.

The quality of such a lens is excellent and it is obtained a clearness of image which is remarkable. This allows to use this lens not only as a contact lens but also as an intra-ocular implant for replacement of the eye crystalline lens, which constitutes a fully unexpected use of the invention lens.

The present invention also concerns a process for preparing this lens, comprising the use of a turning lathe comprising a poppet-head and a pivot or swivel, characterized in that a rough model or lens blank is machined by performing a predetermined voluntary shift of the pivot axis relative to the poppet-head axis so as to form at least an aspherical face having a central zone provided with a predetermined great aberration, on a predetermined size, this great aberration of the central zone being the greatest of the lens. Accordingly, this central zone will constitute the abovesaid central optical zone with a predetermined great aberration/asphericity whereas the rest of the lens will have a peripheral optical zone of essentially slightly aspherical shape.

This shift can be performed frontwards or rearwards with respect to the revolution axis of the lens at the side of the working face of the pivot.

According to a preferred feature of the invention process, this shift preferably ranges between 3 and 5 hundredths of millimeter.

BRIEF DESCRIPTION OF THE DRAWINGS

The invention will be now illustrated with three examples concerning the three actually preferred embodiments given by way of illustration and which cannot be construed as restricting the scope of the invention.

The lenses obtained with the aid of the two first examples are the subject matter of FIGS. 1 and 2.

DESCRIPTION OF THE PREFERRED EMBODIMENTS

EXAMPLE 1.

Contact lens with inner face in the form of a torus of pumpkin type shape and an external face in form of a tapered torus.

The usual lens rough model is taken under dry state, this lens rough model being of the soft type, for instance manufactured with HEMA (polyhydroxyethylmethacrylate) being 38.4% hydrophilic, having a refraction index n under the dry state equal to 1.51 and under the hydrated state equal to 1.44 and further a linear expansion equal to 1.19.

This lens rough model has a disc shape of 5 to 6 millimeters of thickness and a diameter equal to about 17 millimeters.

To machine this lens, a turning lathe having a pivot of fixed axis is used.

The lens rough model or blank is placed on the poppet-head so that the centre of the lens rough model or blank be coincident with the poppet-head axis.

To machine the inner face, then it is introduced a predetermined shift between the puppet head axis and the pivot axis so that the axis of the fixed pivot be excentered forwards with respect to the revolution axis of the lens at the side of the pivot working face (and thus with respect to the axis of the poppet-head which is coincident with the revolution axis of the lens) of a distance of the order of 4 hundredths of millimetre, so that the end of the pivot stroke be in the space.

It is then performed the machining of the concave inner part of the lens by successive cuts, as well known.

It is further performed a polishing of the machined surface with the aid of a resilient flexible polisher which is shaping itself on the surface to be polished, this polisher being of the rubber type covered with a usual polishing cloth as for instance a chamois leather.

According to one of the best embodiments, it is preferred to realize the external convex face with the same relative shift between the pivot axis and the poppet-head axis, thereby obtaining an external face of a tapered torus shape.

With an inner basic radius, under the dry state, equal to 6.72 millimeters and an external basic radius, under the dry state, equal to 8.43 millimeters, it is obtained, with the abovesaid shift of the axis of the order of 4 hundredths of millimeter, a central optical zone of the lens of great asphericity and a peripheral optical zone of slightly aspherical shape having essentially no aberration, so that the corrective power of the lens constitutes, for this central optical zone, a correction for near of the order of minus 8 dioptries and for the peripheral optical zone of the lens, for the correction for far, of minus 15.15 dioptries.

Figure 1:
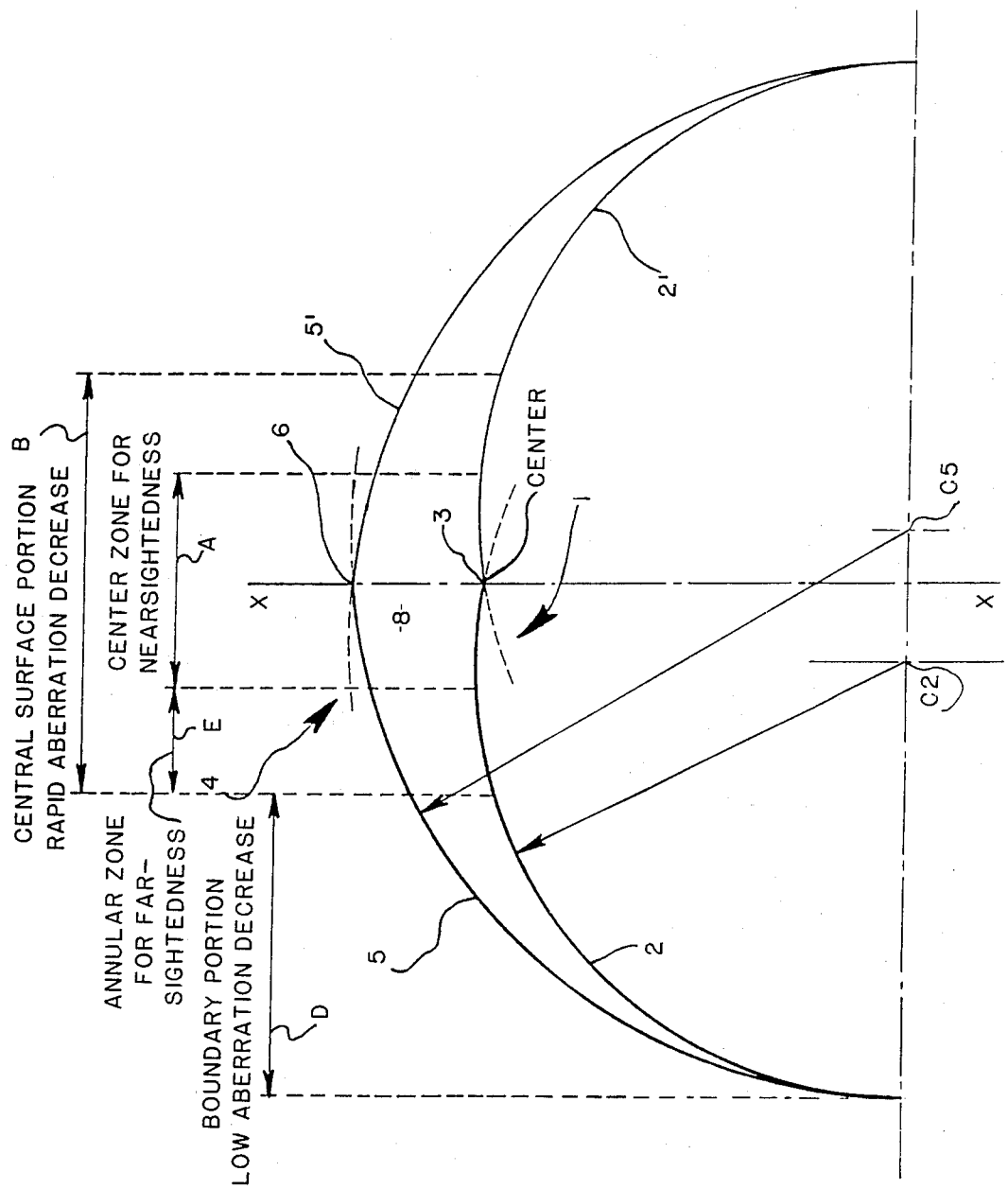

This lens is shown schematically in the enclosed FIG. 1 at a very enlarged scale.

It can be seen that the inner face 1 is concave and presents a form of a torus pumpkin type shape comprising a peripheral optical zone 2 or 2' having in half axial cross-section a substantially slightly aspherical shape and a central optical zone A of great asphericity defined by the meeting of the generating curves 2, 2' of said face. Also, the external face 4 is convex and is presenting a peripheral optical zone 5, 5' having in axial half cross-section a slightly aspherical shape and a central optical zone 6 of great asphericity defined by the meeting of the generating curves 5, 5' of the external face.

More specifically, as illustrated in FIG. 1, the inner lens surface 1 and the outer lens surface 4 each have the shape of torus. The inner face torus 1 is attained by rotating the circular portion 2 illustrated in thicker lines about the torus revolution axis X—X. The center of the circular portion 2 is denoted by reference character C2 which is laterally shifted from the revolution axis X—X and is located with respect to the revolution axis X—X on the same side as the circular portion 2. Due to this particular configuration, the inner lens surface 1 has the angularly projecting center 3.

The outer torus-like lens surface 4 is attained by rotating the thicker circular portion 5 about the axis X—X, with the center of the circular portion 5 being denoted by reference character C5. This center C5 is also laterally shifted with respect to the rotation axis X—X, but is located beyond this axis with respect to the circular portion 5, as clearly illustrated in FIG. 1.

Accordingly, in the embodiment of the present invention illustrated in FIG. 1, a central surface portion B of great aberration is provided for correction of vision for near as well as for vision for far. This central surface portion B includes for this purpose a center zone A for nearsightedness and an annular zone E for farsightedness which surrounds the center zone A.

The central surface portion B is a portion of the inner surface 1 in which the aberration value varies considerably and which is surrounded by a boundary annular outer zone D in which the aberration decreases only slowly toward the periphery of the lens.

The central surface portion B is distinguished from the boundary zone D due to the fact that the aberration value decreases rapidly in the central surface portion B which is essentially divided into two zones, i.e. the center zone A for correction of nearsightedness and a surrounding annular zone E for correction of farsightedness.

In total, this lens has thus a shape generally in torus or a similar shape.

Since the inner face is of a torus shape of pumpkin type shape, this lens will adapt itself easier to the eye shape.

In the conditions of the present example, the greatest difference in corrective power is of the order of 7 dioptries.

Under the hydrated state, this lens will show a corrective power for near of minus 6 dioptries in the centre, and a corrective power for the vision for far at the periphery of minus 11 dioptries, namely a difference of 5 dioptries, in the conditions of practical use.

This lens is used as a contact lens.

Of course, this lens can be performed under the form of a hard contact lens or a flexible contact lens or any combination thereof.

On the other hand, the relative shift of the abovesaid axis can be different for the external face with respect to the inner face, which allows to vary at will the corrective power of such a lens.

EXAMPLE 2

Contact lens with an inner face of a tapered torus shape and an external face of a pumpkin type torus shape It is proceeded in the same manner as in example 1 except that in the present case the axis of the fixed pivot is excentered rearwards with respect to the axis of revolution of the lens at the side of the pivot working face, of a distance equal to the order of 4 hundredths of millimetre.

In that case, it is obtained a central optical zone of great aberration of the lowest corrective power in sign with respect to the periphery of the lens.

In the present case, the corrective power of the central optical zone of great aberration for the vision for far is of minus 15.15 dioptries, the corrective power at the periphery for the vision for near is of minus 8 dioptries. Namely a negative corrective power decreasing from the center to the periphery is obtained.

Figure 2:
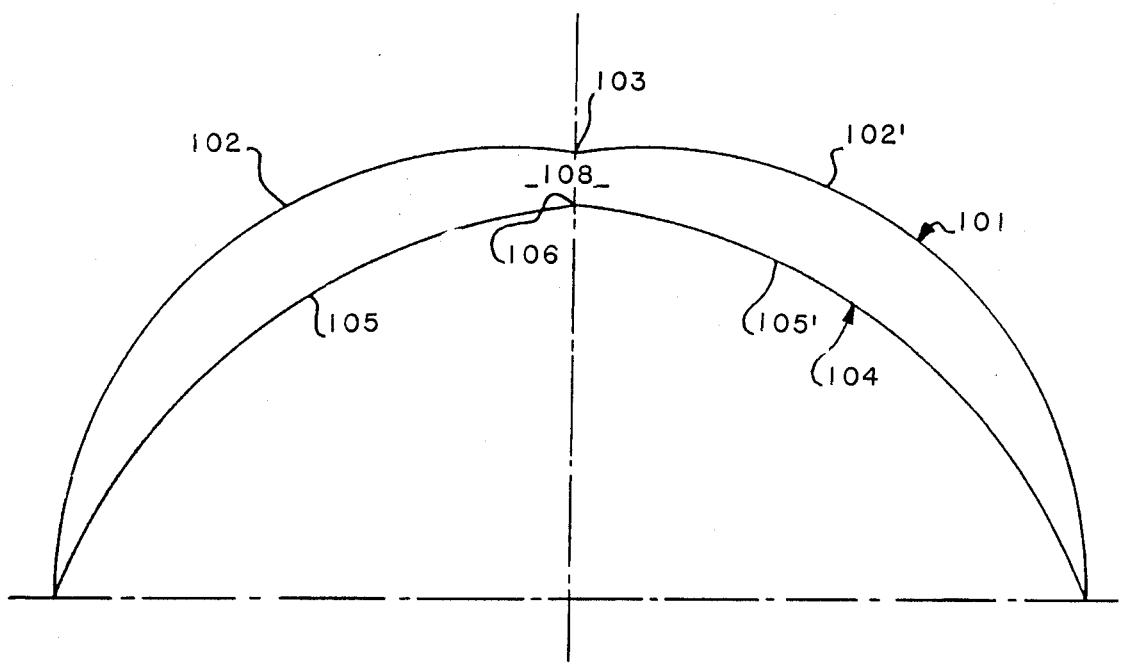

This lens is shown on FIG. 2.

The parts similar to those of the lens shown in FIG. 1 bear the same reference numbers as those of FIG. 1, increased of 100.

It can be noted from the foregoing that for each face which is realized with the shift of the abovesaid axis, the lens is defined by torus surfaces.

EXAMPLE 3

Lens forming an intra-ocular implant to be substituted for the eye crystalline lens In that case, it is taken a hard lens rough model in polymethylmethacrylate for instance not hydrophilic, with a refraction index equal to 1.490, the external convex face of which is machined either in form of a pumpkin type torus or in form of a tapered torus. Preferably, the convex external face is machined in form of a tapered torus, as realized in example 1 for external face 5.

The inner face is the usual inner face of an intraocular implant replacing the eye crystalline lens, namely this inner face may be either plane or smooth and in that case no machining is necessary, or concave or convex, with a machining of this inner face performed as usual.

Of course, the invention is by no ways limited to the described technical means and comprises any technical means constituting technical equivalents to the described means as well as any of their combinations. In particular, such lenses can be realized by casting in moulds having appropriate shapes.

On the other hand, only one face or both faces of the lens can be provided with a central optical zone of the abovesaid predetermined great aberration or asphericity.

The pivot can be replaced by a working table X, Y having an automized displacement, for instance by being ordered by a computer, microprocessor etc. The term "pivot" includes such a working table or similar.

According to the invention, it is clear that only a relative shift between the pivot axis and the poppet-head axis of the turning lathe of at least two or three hundredths of millimetre will cause a great asphericity/aberration/of the central optical zone with a low asphericity/aberration/of the peripheral optical zone, resulting in a sufficient difference of corrective power between said central and peripheral optical zones to provide a correction for the vision for near and for the vision for far in the same lens without junction zone.

What is claimed is:

1. A multifocal contact lens having a convex external face (4) and a concave inner face (1), said inner face (1) being aspherical and having an aberration and thus corrective power varying continuously from a center (3) of said inner face (1) towards a periphery (2, 2') of said inner face (1), said inner face (1) having a central portion (B) locatable in front of the most sensitive part of an eye and having at its center (3) a maximum aberration value which rapidly and progressively decreases radially from said center (3) within said central portion (B) and slowly towards the periphery (2, 2') of the lens so as to provide in a central zone (A) of said central portion (B), a correction for vision for near and in a portion (E) radially succeeding, a correction for vision for far, said aspherical face (1) having a shape of a portion of a surface of revolution, a meridian of which having the shape of a curve with an axis of revolution (X—X) located in a way such that said center (3) in the central zone (A) is angularly projecting towards the eye.

2. Multi focal contact lens according to claim 1, wherein said curve is a circular, parabolic, hyperbolic or elliptic curve.

3. Multifocal contact lens according to claim 1, wherein said aspherical inner face (1) has the general shape of a torus portion (2) wherein a center (C2) of the curved portion generated by rotating said torus portion (2) is laterally shifted from the axis of revolution (X—X) and is located on the same side of the axis of revolution (X—X) as said curved portion (2).

4. Multifocal contact lens according to claim 3, wherein the convex external face (4) is aspherical and has the general shape of a torus portion (5) with a center (C5) of a curved portion (5) generating said outer face torus portion (5) being laterally shifted from the axis of revolution (X—X) and located beyond said axis of revolution (X—X) with respect to said curved portion (5).

5. The contact lens of claim 1, characterized in that said lens is selected from a soft contact lens, a hard contact lens, a flexible contact lens, or any combination thereof.

6. The contact lens of claim 1, characterized in that it is manufactured by casting in a mould of appropriate shape.

* * * * *